May 6, 1969

J. B. KAYE 3,442,016

SURVEYOR'S TARGET STAFF

Filed Nov. 17, 1967

INVENTOR
JONATHAN B. KAYE

BY Beale and Jones

ATTORNEYS

United States Patent Office 3,442,016
Patented May 6, 1969

3,442,016
SURVEYOR'S TARGET STAFF
Jonathan B. Kaye, 5529 Uppingham St.,
Chevy Chase, Md. 20015
Filed Nov. 17, 1967, Ser. No. 684,009
Int. Cl. G01c 15/06
U.S. Cl. 33—74                              1 Claim

ABSTRACT OF THE DISCLOSURE

A surveyor's target staff, consisting of a vertical rod upon which is mounted a sliding target mount and target assembly. The assembly includes a set screw means to hold the assembly at any selected height on the rod. The cross marks for sighting on the front of the target are not interrupted by cutouts in the target, and are fully visible at the point of intersection.

Field of the invention

This invention relates, in general, to the surveying art, and more particularly to a target rod for use in combination with a sighting device for setting levels.

Description of the prior art

The ordinary leveling rod consists of a vertical staff upon which is imprinted or affixed a numerical scale for reading vertical distances. The rod may be fabricated in two portions that are slidable lengthwise relative to each other for purposes of extending the scale. A target is usually slidably mounted over the scale to assist the man at the sighting instrument in taking accurate readings, this target consisting of some form of cross-hairs, but with the portion of the target cut away where the cross-hairs would intersect, so as to allow sighting on the scale. This sort of rod can be quite cumbersome, as it is heavily constructed to prevent damage to the scale portion and/or to the track and clamps by which the two sections slide relatively to each other. Nevertheless, this general unwieldiness must be tolerated when a series of numerical elevation readings must be taken, as on a sloping piece of ground, to determine the amount of earth that must be added or excavated to level the desired area.

In certain leveling operations, however, the point to be leveled is immediately moveable, so that the necessity of taking numerical readings to direct an elevation change, and of returning subsequent to the change to check the results, in obviated A sighting is merely made on the staff placed on the point in question, and the point is moved vertically up or down until the point sighted on the staff indicates the desired level. In this case, and especially when a multiplicity of points are involved, the weight and generally cumbrous nature of the ordinary target staff becomes a particularly inconvenient burden and a more appropriate staff is called for. Also, the common practice of cutting away a portion of the target where the crossmarks would intersect to allow sighting on the scale creates unnecessary source of inaccuracy and inconvenience when multiple level settings of the type not requiring numerical readings are being made.

Summary of the invention

The invention overcomes the disadvantages of the prior art devices by providing a rod that is lighter in weight and is more convenient to handle and carry. Of particular importance, the simplicity of the rod and the target design enhance the ease and accuracy of setting a multiplicity of points at the same level by requiring a minimum of estimation, adjustment, and calibration on the part of the rod man and the sighting instrument man.

The rod, or staff, may be of any lightweight yet reasonably strong material, such as aluminum, and of any cross section, such as circular, as in a rod or pipe, or rectangular, as in a bar. The target assembly is arranged to be easily slidable up and down the rod and is provided with set screws to firmly hold the assembly to the rod at any selected point on the rod. The target is provided with some form of cross marking that continues uninterrupted to its intersection, so that the intersection is fully shown and is readily sighted upon by the man at the sighting level instrument. The simplicity of design and application of the invention allow it to be fabricated at a cost substantially lower than present devices.

Description of the drawings

The foregoing and additional features and advantages of the invention will become apparent from a consideration of the following description of the invention, taken with the accompanying drawings in which.

Description of the preferred embodiment

Figure 1:
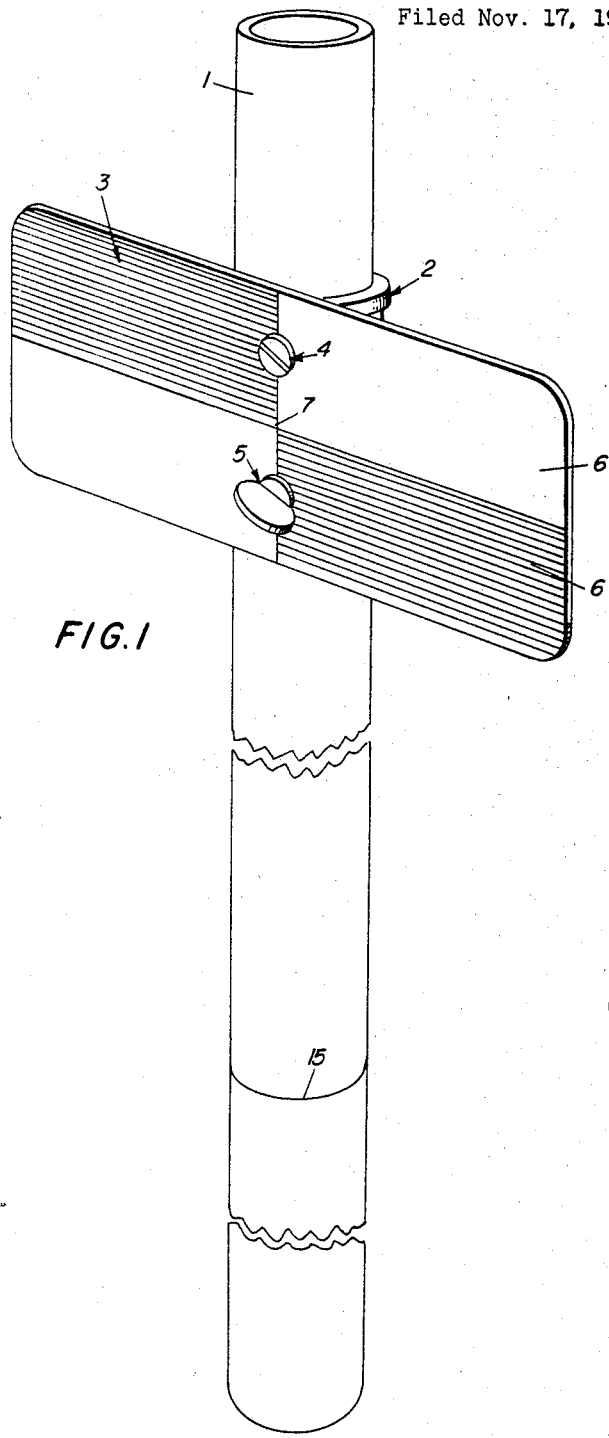
FIG. 1 is an overall perspective view of the rod and target assembly of the invention.

Referring to FIG. 1, the targent rod consists generally of a staff 1, made of a light rigid material such as aluminum pipe or bar stock, on which is mounted an annular sliding target mount 2, to which is affixed the target plate 3 by means of screws 4, 5. The target 3 preferably is a solid flat plate without notches or holes cut out of it save for the holes to accommodate the screws 4, 5. The target is divided into quadrants 6 which are of alternate contrasting colors so as clearly to identify their intersection 7.

Figure 2:
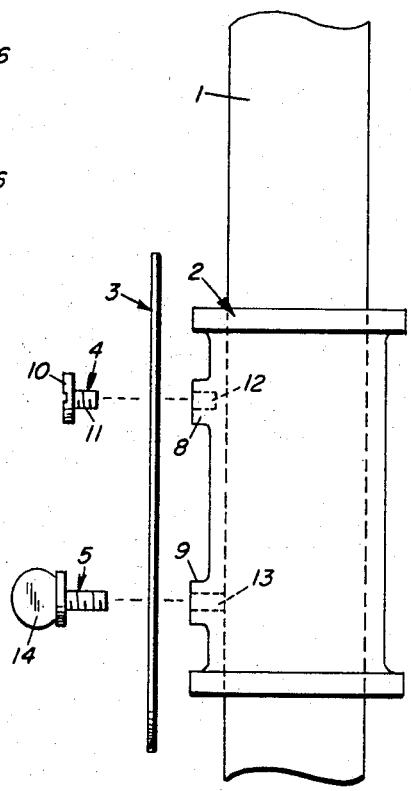
FIG. 2 is a section view showing the target assembly in more detail.

In FIG. 2, it is seen that the annular target mount 2 is slidably mounted on staff 1 by passing staff 1 through the center annulus of target mount 2, said annulus being slightly larger in diameter than the outer diameter of the staff 1. It is also seen that target 3 is securely fastened to target mount 2 by being pressed against the outer flat surfaces of projections 8 and 9 which extend from target mount 2. The target 3 is held in place by the head 10 of screw 4 as the threaded portion 11 of screw 4 is advanced into the threaded receptacle 12 of the projection 8. Sliding target mount 2 is held securely to staff 1 by handscrew 5 when the screw is advanced fully into the threaded hole 13 and abuts against the rod 1. The collar of screw 5 also assists screw 4 in rigidly attaching target 3 to target mount 2. Finger grip 14 of screw 5 allows rapid manual engagement and disengagement of target mount 2 with staff 1.

Referring again to FIG. 1, several threaded joints 15 are provided so that rod 1 may be broken down into sections of convenient length for storage and transportation.

In operation, the target rod is set upon a point of known elevation to which it is desired to make another point or a number of other points correspond. A sighting instrument, set on the level, is sighted on the rod, and target 3 is adjusted by sliding the target mount 2 up or down on the staff 1 until the target center corresponds to the cross-hairs in the sighting instrument. The rod is then set upon the points whose level is to be established, and the points are moved up or down until the target center again lies on the sighting instrument cross-hairs, indicating that the new point has been set at the exact level of the reference point.

The invention is useful in any application where a point or a number of points are to be set at a level corresponding to a reference level. Examples of application for which this rod is better suited than previous devices are in setting the many beams that make up the floor and ceiling structures of a building, aligning long segmented structures such as ballistic tunnels, erecting concrete forms, and leveling the tops of structures such as piles and fence posts.

It is obvious that many materials could be used successfully in the construction of the invention. For instance, the staff could be of aluminum rod, bar stock, or pipe, or could be of any other light metal, or of plastic. The target is preferably made of plastic with the colors painted on, or molded directly into the plastic, but the target may also be made of sheet metal or other suitable material.

Other variations and modifications of the invention within the scope of the following claim will be obvious to those skilled in the art.

I claim:
1. A surveyor's target rod for elevation settings comprising an unmarked rod having threaded joints at selected points to permit the rod to be disassembled into segments; an adjustable target mount comprising an annular bracket slidably fitted over the outside of said rod; a solid, flat planar target affixed to said target mount, said target having a fully shown cross-mark intersection; first screw means passing through said target and engaging said target mount for affixing said taret to said mount; handscrew means passing through said target and through a threaded hole in said target mount for holding said target in vertical alignment with said rod, said handscrew abutting against said staff to hold said target mount at a selected position on said rod corresponding to a reference level, whereby elevation settings may be made by placing one end of said rod on a point to be leveled, sighting on said target, and moving the point to be leveled until the target stands at the proper level.

References Cited

UNITED STATES PATENTS

| | | |
|---|---|---|
| 181,384 | 8/1876 | Whitehouse. |
| 468,864 | 2/1892 | Beers. |
| 695,528 | 3/1902 | Beckley. |
| 826,246 | 7/1906 | Halvorsen. |
| 1,891,573 | 12/1932 | Phelps. |
| 2,346,479 | 4/1944 | Fatkin. |

OTHER REFERENCES

Publication: Dietzgen, "Range Poles."

HARRY N. HAROIAN, *Primary Examiner.*